United States Patent
Raetzsch et al.

Patent Number: 5,962,594
Date of Patent: Oct. 5, 1999

[54] SEGMENTED POLYOLEFINS

[75] Inventors: Manfred Raetzsch, Kirchschlag; Hartmut Bucka, Eggendorf; Achim Hesse, Linz; Norbert Reichelt, Neuhofen, all of Austria

[73] Assignee: Borealis AG, Schwechat-Mannswoerth, Austria

[21] Appl. No.: 09/085,063

[22] Filed: May 27, 1998

[30] Foreign Application Priority Data

Jun. 10, 1997 [DE] Germany ............ 197 24 317

[51] Int. Cl.$^6$ .................................. C08F 267/04
[52] U.S. Cl. .................. 525/285; 525/305; 525/309; 525/322; 525/324
[58] Field of Search .................... 525/285, 305, 525/309, 322, 324

[56] References Cited

U.S. PATENT DOCUMENTS

| | | | |
|---|---|---|---|
| 4,774,280 | 9/1988 | Hauschild | 524/533 |
| 5,411,994 | 5/1995 | Galli | 521/50.5 |
| 5,744,553 | 4/1998 | Kempter | 525/333.8 |

*Primary Examiner*—Paul R. Michl
*Attorney, Agent, or Firm*—Jordan and Hamburg LLP

[57] ABSTRACT

Segmented polyolefins, which are produced by the reaction of mixtures of powdery polyolefins and polyolefin granulates with unsaturated monomers in the presence of thermally decomposing free radical-forming agents in continuous mixers in two consecutive reaction steps in the solid phase, a reaction step in a solid phase/melt transition phase and a melt homogenizing step, have a high strength and tenacity.

The segmented polyolefins, as well as mixtures with conventional polyolefins, are suitable for the production of films, sheets, fibers, panels, coatings, pipes, hollow objects and foams.

10 Claims, No Drawings

SEGMENTED POLYOLEFINS

The invention relates to segmented polyolefins, which are used for the production of semi-finished products and molded materials of high strength and tenacity.

Olefin high molecular weight polymers, such as polyethylene, polypropylene, 1-polybutene and poly-4-methylpentene, because of the flexible chain structure, have a moderate strength level and good tenacity properties. Because they are built up from nonpolar chain segments, polyolefins cannot be wetted adequately and painting or printing requires special measures.

Known measures for increasing the strength level of polyolefins are the reinforcing of polyolefins by fiberglass (Carlson, L., Composite Materials Series, Vol. 7, Thermoplastic Composite Materials, Elsevier, N.Y., 1991), the production of polyolefin blends or polyolefin alloys with polymers, which have a higher modulus, such as polyamide (Mühlhaupt, R., Kunststoffe 84 (1994) 9, 1153–1158) or polystyrene (Modem Plastics International (1996) 4, 93), the incorporation of bulky cycloolefin chain components into the flexible polyolefin chains by copolymerization (Cherdron, H., Angew. Makromol. Chem. 223 (1994), 121–133) or the increasing of the degree of order through the use of metallocene catalysts (Mühlhaupt, R., Gummi-Asbest-Kunststoffe 49 (1996) 5, 394–403).

These known methods for increasing the strength level of polyolefins are always associated with a decrease in tenacity properties, so that, in order to attain a balanced property level, elastomers, such as acid-modified styrene-ethylene-butene block copolymers, must be added (Holsti-Miettinen, R., Polymer Engineering and Known methods for improving the tenacity properties of polyolefins are the addition of elastomers, such as ethylene-propylene elastomers, to increase the tenacity of polypropylene (Karger-Kocsis, Polypropylene, Structure, Blends and Composites, vol. 2, pages 103–125, Chapman and Hall, London, 1995) or the addition of partially cross linked ethylene-propylene-diene elastomers to increase the tenacity of poly-4-methyl-1-pentene (European patent 0 376 213). This addition of elastomer to increase the tenacity properties is, however associated with a decrease in the strength of the polyolefin blends or polyolefin alloys.

Known methods for improving the wettability of polyolefins are the flaming and plasma treatment (Gruner, Ch., Kunststoffe 82 (1992) 9, 802–806), as well as the grafting of hydrophilic, unsaturated monomers, such as acrylic acid or maleic anhydride (Bazkin, A., J. Colloid Interface Sci. 43 (1973) 2, 475–483; Lavielle, L., Macromol. Symp. 23 (1989), 343–353).

The reaction of polyolefins with unsaturated monomers in the presence of thermally decomposing free radical-forming agents in the solid phase (European patent 0 138 224), in the melt (European patent 0 494 655), in solution (Wang, Y., J. Appl. Polymer Sci. 52 (1994), 1411–1417), as well as in the disperse phase (Japanese patent 06 136 070) with formation of grafter copolymers is known. It is furthermore known that, for the grafting, mixtures of unsaturated monomers can be used (U.S. Pat. No. 5,344,886) or that the grafting can be carried out in the solid phase and subsequently in the melt (European patent 0 461 881).

The known, main areas of use of grafted polyolefin copolymers are polyolefin formulations of improved printability, paintability and adhesion to metallic substrates (Lavielle, L., Macromol. Symp. 23 (1989), 343–353) as well as compatibilizers for polyolefin blends with incompatible polymer components (Folkes, M., Polymer Blends and Alloys, 53–63, Blackie Academic & Professional London 1993).

It is an object of the invention to form polyolefins of high strength and tenacity, which avoid the disadvantages of known polyolefin formulations and are suitable for producing semi-finished products and molded materials.

This objective was accomplished by segmented polyolefins, which were synthesized by the reaction of mixtures of 80 to 99% by weight of polyolefin powders with a particle size ranging from 0.001 to 2 mm and 20 to 1% by weight of polyolefin granulates with a particle size ranging from 2 to 8 mm with unsaturated monomers in continuous mixers in three consecutive reaction steps in the solid phase and in a solid phase-melt transition phase.

The polyolefin powders used consist of propylene homopolymers and/or copolymers of propylene and $\alpha$-olefins with 2 to 18 carbon atoms, particularly from random propylene copolymers, propylene block copolymers, random propylene block copolymers and/or elastomeric polypropylenes, of ethylene polymers, preferably ethylene polymers, 1-polybutene, poly-4-methyl-1-pentene synthesized using Ziegler Natta catalysts or metallocene catalysts, mixtures of said polyolefins as well as mixtures of these polyolefin powders, the polyolefin powders having a particle size ranging from 0.001 to 2 mm and preferably from 0.05 to 0.5 mm. It is of particular advantage to use polyolefin powders directly when they are discharged from the polymerization reactor.

The polyolefin granulates used consist of ethylene polymers, preferably of ethylene polymers synthesized using free radical initiators or using Ziegler Natta catalysts or metallocene catalysts, ethylene-propylene copolymers, copolymers of ethylene and $\alpha$-olefins with 4 to 18 carbon atoms, ethylene-propylene-diene terpolymers, ethylene-butadiene-styrene terpolymers, propylene block copolymers, mixtures of these polyolefins or mixtures of these polyolefin granulates, the particle diameter of the granulate particles being 2 to 8 mm and preferably 3 to 6 mm.

For the synthesis of the segmented polyolefins, a reaction is carried out in the solid phase in the first reaction step with mixtures of polyolefin powders and polyolefin granulates at reaction temperatures of 100° to 40° C. below the melting temperature or softening temperature of the polyolefins with 5 to 30% by weight, based on the polyolefins used, of acrylic acid, acrylonitrile, $C_4$ to $C_{21}$ acrylate esters, methacrylic acid, methacrylonitrile, $C_5$ to $C_{22}$ methacrylate esters, styrene, monoalkyl ($C_1$ to $C_{12}$) styrenes, dialkyl ($C_1$ to $C_6$) styrenes, $C_1$ to $C_{12}$ alkoxy styrenes, monohalogenstyrenes, $C_1$ to $C_{11}$ alkyl esters of styrene carboxylic acid and/or $C_4$ to $C_{21}$ dicarboxylic acid anhydrides in the presence of 0.05 to 0.85% by weight, based on the polyolefins used, of acyl peroxides, alkyl peroxides, hydroperoxides, peroxycarbonates and/or peresters.

Examples of the $C_4$ to $C_{21}$ acrylate esters, used as monomers for the synthesis of the segmented polyolefins, are methyl acrylate, ethyl acrylate, t-butyl acrylate, ethylhexyl acrylate, benzyl acrylate and stearyl acrylate.

Examples of the $C_4$ to $C_{22}$ methylacrylate esters, used as monomers for the synthesis of the segmented polyolefins, are methyl methacrylate, ethyl methacrylate, t-butyl methacrylate, ethylhexyl methacrylate, benzyl methacrylate and stearyl methacrylate.

Examples of the styrene derivatives, monoalkyl ($C_1$ to $C_{12}$) styrenes, dialkyl ($C_1$ to $C_6$) styrenes, $C_1$ to $C_{12}$ alkoxy styrenes, monohalogen styrenes and $C_1$ to $C_{11}$ alkyl esters of styrene carboxylic acid, used as monomers for the synthesis of segmented polyolefins, are $\alpha$-methylstyrene, dimethylstyrene, methoxystyrene, chlorostyrene and ethylhexyl esters of styrene carboxylates.

Examples of the unsaturated $C_4$ to $C_{21}$ dicarboxylic acid anhydrides, used for the synthesis of the segmented polyolefins in the first reaction step, are maleic anhydride, fumaric anhydride, itaconic anhydride and/or norbornenedicarboxylic acid anhydride.

Examples of the acyl peroxides, used in the first reaction step of the synthesis of the segmented polyolefins, are acetyl benzoyl peroxide, benzoyl peroxide, 4-chlorobenzoyl peroxide, dinitrobenzoyl peroxide, 3-methoxybenzoyl peroxide and methylbenzoyl peroxide.

Examples of alkyl peroxides, used in the first reaction step of the synthesis of the segmented polyolefins, are alkyl t-butyl peroxide, 2,2-bis-(t-butylperoxybutane), 1,1-bis-(t-butylperoxy)-3,3,5-trimethylcyclohexane, diisopropylaminomethyl-t-amyl peroxide, dimethylamino-t-amyl peroxide, diethylaminomethyl-t-butyl peroxide, dimethylaminomethyl-t-butyl peroxide, 1,1-di(t-amylperoxy)cyclo-hexane, t-amyl peroxide, t-butylcumyl peroxide, t-butyl peroxide and 1-hydroxybutyl-n-butyl peroxide.

Examples of hydroperoxides, used in the first reaction step of the synthesis of the segmented polyolefins, are decalin hydroperoxide and tetralin hydroperoxide.

Examples of peresters and peroxycarbonates, used in the first reaction step of the synthesis of the segmented polyolefins, are butyl peracetate, cumyl peracetate, cumyl perpropionate, cyclohexyl peracetate, di-t-butyl peradipate, di-t-butyl perazelate, di-t-butyl perglutarate, di-t-butyl perphthalate, di-t-butyl persebacate, 4-nitrocumyl perpropionate, 1-phenylethyl perbenzoate, phenylethylnitro perbenzoate, t-butyl-bicyclo-(2,2,1)heptane percarboxylate, t-butyl-4-carbomethoxy perbutyrate, t-butyl-cyclobutane percarboxylate, t-butylcyclohexyl peroxycarboxylate, t-butylcyclopentyl percarboxylate, t-butylcyclopropane percarboxylate, t-butyldimethyl percinnamate, t-butyl-2-(2, 2-diphenylvinyl) perbenzoate, t-butyl-4-methoxy perbenzoate, t-butyl perbenzoate, t-butylcarboxycyclohexane, t-butyl pernaphthoate, t-butyl peroxyisopropylcarbonate, t-butyl pertoluate, t-butyl-1-phenylcyclopropyl percarboxylate, t-butyl-2-propyl 2-perpentenoate, t-butyl-1-methylcyclopropyl percarboxylate, t-butyl-4-nitrophenyl peracetate, t-butylnitrophenyl peroxycarbamate, t-butyl-N-succinimido percarboxylate, t-butyl percrotonate, t-butyl permaleate, t-butyl permethacrylate, t-butyl peroctoate, t-butyl peroxyisopropylcarbonate, t-butyl perisobutyrate, t-butyl peracrylate and t-butyl perpropionate.

With particular advantage, mixtures of these free radical-forming agents are used in the first reaction step, in order to have available a sufficient concentration of free radical-forming agents, which have not already been decomposed thermally, in the second and third steps of the reaction.

The particular advantage of using different polyolefin components in power form and/or in granulate form consists therein that, because of the different diffusion kinetics of the monomers and peroxides used, the concentration in the particles can be controlled by the particle diameter.

For the synthesis of the segmented polyolefins in the second reaction step in the solid phase at reaction temperatures of 60° to 20° C. below the melting temperature or the softening temperature of the polyolefins, the polyolefins, modified in the first reaction step, are reacted with 0.5 to 20% by weight, based on the polyolefins used, of acrylonitrile, methacrylonitrile, $C_5$ to $C_{22}$ methacrylate esters, styrene, monoalkyl ($C_1$ to $C_{12}$) styrenes, dialkyl ($C_1$ to $C_6$) styrenes, $C_1$ to $C_{12}$ alkoxy styrenes, monohalogenstyrenes, $C_1$ to $C_{11}$ alkyl esters of styrene carboxylic acid, $C_5$ to $C_{14}$ vinylsilanes, $C_6$ to $C_{15}$ acrylatesilanes, vinylpyridine, vinyloxazolin, isopropenyloxazolin, vinylpyrrolidone, aminoalkyl ($C_1$ to $C_8$) acrylates, aminoalkyl ($C_1$ to $C_8$) methacrylates, $C_3$ to $C_{20}$ vinyl ethers, hydroxyalkyl ($C_1$ to $C_8$) acrylates, hydroxyalkyl ($C_1$ to $C_8$) methacrylates and optionally with 0.1 to 5% by weight, based on the polyolefins used, of divinylbenzene, allyl acrylate, allyl methacrylate, $C_8$ to $C_{14}$ diacrylates, $C_9$ to $C_{15}$ dimethacrylates, $C_{12}$ to $C_{17}$ acrylate esters of polyalcohols and/or $C_{15}$ to $C_{21}$ methacrylate esters of polyalcohols.

Examples of the $C_5$ to $C_{14}$ vinylsilanes, used for the synthesis of the segmented polyolefins in the second reaction step, are vinyltriethoxysilane, vinyltriisopropoxysilane, vinyltrimethoxysilane and aminoethyldiethoxyvinylsilane.

Examples of the $C_6$ to $C_{15}$ acrylatesilanes, used for the synthesis of the segmented polyolefins in the second reaction step, are methacryloxypropyltrimethoxysilane, methacryloxypropyldimethylethoxysilane, methacryloxypropylmethyldiethoxysilane, methacrylpropyltriethoxysilane and methacryloxypropyltrimethoxysilane.

Examples of the $C_1$ to $C_8$ alkyl acrylates, used for the synthesis of the segmented polyolefins in the second reaction step, are aminoethyl acrylate, aminoisobutyl acrylate and aminoethylhexyl acrylate.

Examples of the $C_1$ to $C_8$ alkyl methacrylates, used for the synthesis of the segmented polyolefins in the second reaction step, are aminoethyl methacrylate, aminoisobutyl methacrylate and aminoethylhexyl methacrylate.

Examples of the $C_3$ to $C_{20}$ vinyl ethers, used for the synthesis of the segmented polyolefins in the second reaction step, are vinyl methyl ether, vinyl isobutyl ether, hydroxyethyl ether, hydroxybutyl vinyl ether and vinyl stearyl ether.

Examples of the $C_1$ to $C_8$ alkyl acrylates, used for the synthesis of the segmented polyolefins in the second reaction step, are hydroxyethyl acrylate, hydroxyisobutyl acrylate and hydroxyethylhexyl acrylate.

Examples of the $C_1$ to $C_8$ alkyl methacrylates, used for the synthesis of the segmented polyolefins in the second reaction step, are hydroxyethyl methacrylate, hydroxyisobutyl methacrylate and hydroxyethylhexyl methacrylate.

Examples of the $C_8$ to $C_{14}$ diacrylates, used for the synthesis of the segmented polyolefins in the second reaction step, are ethylene glycol diacrylate, butylene glycol diacrylate, dihydroxypentane diacrylate, trimethylene glycol diacrylate and dihydroxyhexane diacrylate.

Examples of the $C_8$ to $C_{19}$ dimethacrylates, used for the synthesis of the segmented polyolefins in the second reaction step, are ethylene glycol dimethacrylate, butylene glycol dimethacrylate, dihydroxypentane dimethacrylate and trimethylene glycol dimethacrylate.

Examples of the $C_{12}$ to $C_{17}$ acrylate esters of polyalcohols, used for the synthesis of the segmented polyolefins in the second reaction step, are glycerin triacrylate, trimethylolpropane triacrylate and pentaerythritol tetraacrylate.

Examples of the $C_{15}$ to $C_{21}$ methacrylate esters of polyalcohols, used for the synthesis of the segmented polyolefins in the second reaction step, are glycerin trimethacrylate, trimethylolpropane trimethacrylate and pentaerythritol tetramethacrylate.

In the third reaction step of the synthesis of segmented polyolefins, in a solid phase/melt transition phase at reaction temperatures of 40° C. below the melting temperature or the softening temperature of the polyolefins up to 40° C. above the melting temperature or the softening temperature of the polyolefins, the polyolefins, modified in the first and in the subsequent second reaction step, are reacted with 0.1 to 5% by weight, based on the polyolefins used, of multifunctional, unsaturated monomers of the divinylbenzene, butadiene, isoprene, $C_8$ to $C_{14}$ diacrylate, $C_9$ to $C_{15}$ dimethacrylate, $C_{12}$ to $C_{17}$ acrylate ester of polyalcohols, $C_{15}$ to $C_{21}$ methacrylate ester of polyalcohols and/or $C_9$ to $C_{22}$ bismaleiimide type.

Examples of the $C_9$ to $C_{22}$ bismaleiimides, used for the synthesis of the segmented polyolefins in the third reaction step, are bismaleiimidobenzene, bismaleiimidodiphenylmethane and bismaleiimidotetramethyldiphenylmethane.

Advantageously, also mixtures of the bifunctional, ethylenically unsaturated monomers are used in the third reaction step.

The polyolefins, modified in the three consecutive reaction steps, are melted and homogenized in a known manner, optionally with the addition of 0.01 to 45% by weight, based on the polyolefins used, of auxiliary materials, with heating of the modified polyolefins to temperatures of 15° to 130° C. above the melting temperature or the softening temperature of the polyolefins.

During the second reaction step and/or during the third reaction step and/or during the melting step, other polymer granulates, selected from polystyrenes, styrene-butadiene-styrene block copolymers, styrene-ethylene-butadiene-styrene block copolymers, styrene-isoprene-styrene block copolymers, ethylene-propylene rubbers, ethylene-propylene-diene rubbers, polyamides, polyethylene terephthalate, polybutylene terephthalate, polycarbonates, polyphenylene oxides, liquid crystalline polymers, polyethylene glycols and/or polypropylene glycols, as well as oligoethylene glycols and/or oligopropylene glycols may optionally be added.

The auxiliary materials, optionally added after the segmented polyolefins have been melted, are 0.01 to 2.5% by weight of stabilizers, 0.1 to 1% by weight of antistatic agents, 0.2 to 3% by weight of pigments, 0.05 to 1% by weight of nucleating agents, 0.1 to 3% by weight of silanol condensation catalysts, 5 to 40% by weight of fillers and reinforcing materials, 2 to 20% by weight of flame retardants and/or 0.01 to 1% by weight of processing aids, in each case based on the polyolefins used.

As stabilizers, preferably mixtures of 0.01 to 0.6% by weight of phenolic antioxidants, 0.01 to 0.05% by weight of benzofuranone derivatives, 0.01 to 0.6% by weight of processing stabilizers based on phosphites, 0.01 to 0.6% by weight of high temperature stabilizers based on disulfides and thioethers and/or 0.01 to 0.8% by weight of sterically hindered amines (HALS) are used.

Suitable phenolic antioxidants are 2-t-butyl-4,6-dimethylphenol, 2,6-di-t-butyl-4-methylphenol, 2,6-di-t-butyl-4-isoamylphenol, 2,6-di-t-butyl-4-ethylphenol, 2-t-butyl-diisopropylphenol, 2,6-dicyclopentyl-4-methylphenol, 2-t-butyl-4,6-dioctyl-phenol, 2,5-di-t-butylhydroquinone, 2,6-di-t-butyl-4,4-hexadecyloxyphenol, 2,2'-methylene-bis(6-t-butyl-4-methylphenol), 4,4'-thio-bis-(6-t-butyl-2-methylphenol), octadecyl 3(3,5-di-t-butyl-4-hydroxyphenyl)propionate, 1,3,5-trimethyl-2,4,6-tris(3',5'-di-t-butyl-4-hydroxybenzyl)benzene and/orpentaerythritoltetrakis(3-(3,5-di-t-butyl-4-hydroxy-phenyl) propionate.

As benzofuranone derivative, 5,7-di-t-butyl-3-(3,4-di-methylphenyl)-3H-2-benzofuranone is particularly suitable.

As HALS compounds, bis-2,2,6,6-tetramethyl-4-piperidyl sebacate and/or poly-((1,1,3,3,-tetramethylbutyl)-imino)-1,3,5-triazine-2,4,diyl)(2,2,6,6-tetramethylpiperidyl)-amino)-hexamethylene-4-(2,2,6,6-tetramethyl)piperidyl)-imino) are particularly suitable.

As nucleating agents, o nucleating agents, such as talcum or the sodium salt of methylene-bis(2,4-di-t-butylphenol) phosphoric acid of β nucleating agents, such as adipic dianilide, dibenzoquinacridone or N,N'-dicyclohexyl-2,6-naphthalene dicarboxamide, are used.

As silanol condensation catalyst, for the inventive method, preferably dibutyl tin dilaurate is used.

As processing aids, calcium stearate, magnesium stearate and/or waxes can be used.

The segmented polyolefins of high strength and tenacity are produced according to an inventive method, for which mixtures of 80 to 99% by weight of polyolefin powders with a particle size ranging from 0.001 to 2 mm and 20 to 1% by weight of polyolefin granulates with a particle size ranging from 2 to 8 mm are reacted with unsaturated monomers in continuous mixers in three consecutive reaction steps in the solid phase and in a solid phase/melt transition phase.

In the first reaction step in the solid phase, the reaction of claim 5 takes place at residence times of 5 to 20 minutes, in the second reaction step at residence times of 2 to 10 minutes and in the third reaction step at residence times of 0.2 to 2 minutes.

The polyolefins, modified in the three consecutive reaction steps, are melted, homogenized and, optionally with the addition of entraining agents, degassed and discharged in a known manner, optionally with the addition of 0.01 to 45% by weight, based on the polyolefins used, of auxiliary materials, with heating of the modified polyolefins to temperatures of 15° to 130° C. above the melting temperature or softening temperature of the polyolefins at a residence time of 0.2 to 4 minutes.

The reaction of mixtures of polyolefin powders and granulates with unsaturated monomers takes place pursuant to the invention preferably in a mixer cascade of two heatable, continuous screw conveyors for powdery media and one extruder of high homogenizing action, preferably a twin-screw extruder with an L/D ratio of 26 to 36.

The reaction in a cascade extruder of coupled mixing cells represents a further, preferred variation for the reaction of the mixtures of polyolefin powders and granulates with unsaturated monomers.

For effective homogenization of the reaction mixtures, the reactor segments, in which the reaction of the mixtures of polyolefin powders and granulates with the unsaturated monomers is to be carried out, are equipped with propeller mixing aggregates before the reaction mixtures are discharged into the reactor segment for the next reaction step or for the melting.

For the second and third reaction steps, the monomers are supplied through metering spray cans into the sides of the reactor segments. At the addition sites, partial diffusion zones are formed in which, during the mixing process, the reaction rate is low due to the cooling resulting from the addition of monomers. Pursuant to the invention, the reactor segments for the second reaction step and/or the third reaction step and/or the reactor segment for the melting step can be equipped with facilities for metering polymer granulates and/or highly viscous media.

The special advantage of the inventive method consists therein that, by a specific selection of composition and particle size of the polyolefins used, the absorption of monomers by the mixtures of different polyolefin components can be varied and that, due to the technology of the three reaction steps, polyolefins with differently linked polymer sequences are formed on the basis of the monomers used and that grafted copolymers, with a random composition of the grafted side chains, are not formed. The third reaction step is intended to partially link the polyolefins modified by the segmenting.

Therefore, due to the inventive method, segmented polyolefins with a wide range of possible property combinations, from solid to hard to tough to soft to hydrophobic to hydrophilic can be achieved, depending on the choice of starting materials and on the reaction conditions.

The inventive, segmented polyolefins and mixtures of these segmented polyolefins with unmodified polyolefins are preferable suitable for the production of films, sheets, fibers, panels, coatings, pipes, hollow objects and foams.

EXAMPLE 1

For the preparation of a segmented polyolefin, a mixture of 85% by weight of a powdery, random polypropylene copolymer, with a melt index of 0.95 g/10 minutes at 230° C./2.16 kg, an ethylene content of 3.5% by weight and an average particle size of 0.15 mm, and 15% by weight of an LDPE granulate, with a density of 0.918 g/cc, a melt index of 0.55 g/10 minutes at 190° C./2.12 kg and an average particle diameter of 4.5 mm, is used.

The reaction with the reactants takes place continuously in a mixer cascade of two heatable, continuous screw conveyors and a twin screw extruder.

The mixture of polypropylene and polyethylene, together with 0.1% by weight of calcium stearate, 18% by weight of methyl methacrylate and 0.18% by weight of bis(t-butylperoxy)-2,5-dimethylhexane, 0.20% by weight of t-butyl peroxybenzoate and 0.12% by weight of dibenzoyl peroxide, in each case based on the polyolefins used, is added in the first reaction step to a continuous screw conveyor, heated to a temperature of 78° C. After a residence time of 9.5 minutes, the reaction mixture is transferred to a second screw conveyor, which is heated to 95° C.

In the second reaction step, a mixture of 6.5% by weight of styrene and 4.5% by weight of hexyl acrylate is added to the reaction mixture in the solid phase in the second screw conveyor, the residence time in the second screw conveyor being 4.5 minutes.

The mixture is added to a hermetically sealed twin screw extruder with a temperature profile of 120°/145°/165°/175°/190°/220°/190°/170°, the feed zone of which is supplied with a mixture of 10% by volume of butadiene and 90% by volume of nitrogen. In zone 6, 0.4% by weight of sodium bicarbonate, 0.5% by weight of calcium pimelate, 0.8% by weight of pentaerythritol tetrakis(3-(3,5-di-t-butyl-4-hydroxy-phenyl))propionate and 0.1% by weight of bis-2,2,6,6-tetramethyl-4-piperidyl sebacate are added to the melt of the segmented polyolefin. The reaction mixture is subjected to vacuum degassing, discharged at 180° C. and granulated.

As determined by IR spectroscopy, the segmented polyolefin contains 0.18% by weight of bound butadiene, 16.4% of bound methyl methacrylate, 6.2% by weight of bound styrene and 4.2% by weight of bound hexyl acrylate. The melt index is 1.15 g/10 min. at 230° C./2.16 kg.

EXAMPLE 2

For the preparation of a segmented polyolefin, a mixture of 55% by weight of a powdery, ethylene homopolymer, with a melt index of 0.20 g/10 minutes at 190° C./5 kg and an average particle size of 0.08 mm, and 45% by weight of a granular polypropylene block copolymer with a density of 0.91 g/cc, a melt index of 0.45 g/10 minutes at 190° C./5 kg, an ethylene content of 6.5% by weight and an average particle diameter of 3.4 mm, is used.

The reaction with the reactants takes place in a cascade extruder of four mixing cells, coupled together, with facilities for supplying liquid monomers through metering spray cans through the sides of mixing cells 2 and 3 and a metering device for supplying an extrudate of powdery media through the sides of coupled mixing cell 4.

The polyolefin mixture, together with 0.15% by weight of magnesium stearate, 12% by weight of acrylonitrile, 8% by weight of methacrylic acid, 0.15% by weight of t-butyl perbenzoate and 0.18% by weight t-butyl perbutyrate, in each case based on the polyolefin mixture used, is added to the first mixing cell of the cascade extruder, which has been heated to 65° C. After a residence time of 11.5 minutes, the reaction mixture is transferred to the second mixing cell, which is heated to 95° C.

In a second reaction step in the solid phase, a mixture of 4% by weight of isopropyl vinyl ether and 4% by weight of vinyltrimethoxysilane, in each case based on the polyolefin mixture, is added to the reaction mixture in the second mixing cell, the residence time in the second mixing cell being 4.5 minutes.

The mixture is added to the third mixing cell, which is maintained at 108° C. and into which 2% by weight, based on the polyolefin mixture, of a 10% solution of divinylbenzene in acetone is added. The residence time in the third mixing cell is 1.2 minutes.

After transfer to the fourth mixing cell, the segmented polyolefin is melted at 215° C. and homogenized with the mixture of auxiliary materials (0.5% by weight of calcium pimelate, 0.1% by weight of Irganox 1010 and 0.1% by weight of Irgaphos 168, in each case based on the polyolefin mixture), added over a side extrudate addition facility.

After discharge and granulation, IR spectroscopy revealed that the following monomers were bound in the segmented polyolefin in the proportions given:
acrylonitrile 11.4% methacrylic acid 7.7%
divinylbenzene 0.16% isopropyl vinyl ether 3.8%
vinyltrimethoxysilane 3.7%

The melt index is 0.75 g/10 min. at 230° C./2.16 kg.

We claim:

1. Segmented polyolefins of high strength and tenacity, characterized in that the segmented polyolefins are produced by the reaction of mixtures of 80 to 99% by weight of polyolefin powders with a particle size ranging from 0.001 to 2 mm, and 20 to 1% by weight of polyolefin granulates with a particle size ranging from 2 to 8 mm, with unsaturated monomers in continuous mixers in two consecutive reaction steps in the solid phase, a reaction step in a first solid phase/melt transition phase, and a melt homogenizing step, wherein the polyolefin powders used consist of propylene homopolymers and/or copolymers of propylenes and α-olefins with 2 to 18 carbon atoms, ethylene polymers, 1-polybutene, poly-4-methyl-1-pentene, and the polyolefin granulates used consist of ethylene polymers, ethylene propylene copolymers, copolymers of ethylene and α-olefins with 4 to 18 carbon atoms, ethylene-propylene-diene terpolymers, ethylene-butadiene-styrene terpolymers, propylene block copolymers, mixtures of these polyolefins or mixtures of these polyolefin granulates, wherein a) in the first reaction step in the solid phase, mixtures of polyolefin powders and polyolefin granulates are reacted at reaction temperatures of 100° to 40° C. below the melting temperature or softening temperature of the polyolefins with 5 to 30% by weight, based on the polyolefins used, of acrylic acid, acrylonitrile, $C_4$ to $C_{21}$ acrylate esters, methacrylic acid, methacrylonitrile, $C_5$ to $C_{22}$ methacrylate esters, styrene, monoalkyl ($C_1$ to $C_{12}$) styrenes, dialkyl ($C_1$ to $C_6$) styrenes, $C_1$ to $C_{12}$ alkoxy styrenes, monohalogenstyrenes, $C_1$ to $C_{11}$ alkyl esters of styrene carboxylic acid and/or unsaturated $C_4$ to $C_{21}$ dicarboxylic acid anhydrides in the presence of 0.05 to 0.85% by weight, based on the polyolefins used, of acyl peroxides, alkyl peroxides, hydroperoxides, peroxycarbonates and/or peresters, b) in the second reaction step in the solid phase at reaction temperatures of 60° to 20° C. below the melting temperature or the softening temperature of the polyolefins, the polyolefins, modified in a), are reacted with 0.5 to 20% by weight, based on the polyolefins used, of acrylonitrile, methacrylonitrile, $C_5$ to $C_{22}$ methacrylate esters, styrene, monoalkyl ($C_1$ to $C_{12}$) styrenes, dialkyl ($C_1$ to $C_6$) styrenes, $C_1$ to $C_{12}$ alkoxy styrenes, monohalogenstyrenes, $C_1$ to $C_{11}$ alkyl esters of styrene carboxylic acid, $C_5$ to $C_{14}$ vinylsilanes, $C_6$ to $C_{15}$ acrylatesilanes, vinylpyridine, vinyloxazolin, isopropenyloxazolin, vinylpyrrolidone, aminoalkyl ($C_1$ to $C_8$) acrylates, aminoalkyl ($C_1$ to $C_8$) methacrylates, $C_3$ to $C_{20}$ vinyl ethers, hydroxyalkyl ($C_1$ to $C_8$) acrylates, hydroxyalkyl ($C_1$ to $C_8$) methacrylates and optionally with 0.1 to 5% by weight, based on the polyolefins used, of divinylbenzene, allyl acrylate, allyl methacrylate, $C_8$ to $C_{14}$ diacrylates, $C_9$ to $C_{15}$ dimethacrylates, $C_{12}$ to $C_{17}$ acrylate esters of polyalcohols and/or $C_{15}$ to $C_{21}$ methacrylate esters of polyalcohols, c) in the third reaction step, in a solid phase/melt transition phase at reaction temperatures of 40° C. below the melting temperature or the softening temperature of the polyolefins up to 40° C. above the melting temperature or the softening temperature of the polyolefins, the polyolefins, modified in a) and subsequently in b), are reacted with 0.1 to 5% by weight, based on the polyolefins used, of multifunctional, unsaturated monomers of the divinylbenzene, butadiene, isoprene, $C_8$ to $C_{14}$ diacrylate, $C_9$ to $C_{15}$ dimethacrylate, $C_{12}$ to $C_{17}$ acrylate ester of polyalcohols, $C_{15}$ to $C_{21}$ methacrylate ester of polyalcohols and/or $C_9$ to $C_{22}$ bismaleiimides type and d) in a melt homogenization step, the polyolefins, modified in the three reaction steps a, b and c, are melted and homogenized in a known manner optionally with the addition of 0.01 to 45% by weight, based on the polyolefins used, of auxiliary materials, with heating of the modified polyolefins to temperatures of 15° to 130° C. above the melting temperature or the softening temperature of the polyolefins, and wherein, during the second reaction step b) and/or during the third reaction step c) and/or during the melt homogenizing step d), 1 to 40% by weight, based on the polyolefins used, of further polymer granulates selected from polystyrenes, styrene-butadiene-styrene block copolymers, styrene-ethylene-butadiene-styrene block copolymers, styrene-isoprene-styrene block copolymers, ethylene-propylene rubbers, ethylene-propylene-diene rubbers, polyamides, polyethylene terephthalate, polybutylene terephthalate, polycarbonates, polyphenylene oxides, liquid crystalline polymers, polyethylene glycols and/or polypropylene glycols, as well as oligoethylene glycols and/or oligopropylene glycols may optionally be added.

2. The segmented polyolefins of high strength and tenacity of claim 1, characterized in that the ethylene polymers, used as polyolefin powders, consist of ethylene polymers synthesized using Ziegler Natta catalysts or metallocene catalysts.

3. The segmented polyolefins of high strength and tenacity of claims 1 or 2, characterized in that the polyolefin granulates used consist of ethylene polymers, which are synthesized using free radical initiators and/or Ziegler Natta catalysts or metallocene catalysts.

4. The segmented polyolefins of claims 1 or 2, characterized in that the auxiliary materials, added after the three consecutive reaction steps, are 0.01 to 2.5% by weight of stabilizers, 0.1 to 1% by weight of antistatic agents, 0.2 to 3% by weight of pigments, 0.05 to 1% by weight of nucleating agents, 0.1 to 3% by weight of silanol condensation catalysts, 5 to 40% by weight of fillers or reinforcing agents, 2 to 20% by weight of flame retardants and 0.01 to 1% by weight of processing aids, based on the polyolefins used.

5. A method for the production of segmented polyolefins of high strength and tenacity, characterized in that mixtures of 80 to 99% by weight of polyolefin powders with a particle size ranging from 0.001 to 2 mm, and 20 to 1% by weight of polyolefin granulates with a particle size ranging from 2 to 8 mm are subjected to a reaction with unsaturated monomers in continuous mixers in two consecutive reaction steps in the solid phase, a reaction step in a solid phase/melt transition phase, as well as in a melt homogenizing step, wherein the polyolefin powders used consist of propylene homopolymers and/or copolymers of propylenes and α-olefins with 2 to 18 carbon atoms, ethylene polymers, 1-polybutene, poly-4-methyl-1-pentene, mixtures of said polyolefins as well as mixtures of these polyolefin powders and the polyolefin granulates used consist of ethylene polymers, ethylene propylene copolymers, copolymers of ethylene and α-olefins with 4 to 18 carbon atoms, ethylene-propylene-diene terpolymers, ethylene-butadiene-styrene terpolymers, propylene block copolymers, mixtures of these polyolefins or of mixtures of these polyolefin granulates, and wherein a) in the first reaction step in the solid phase, mixtures of polyolefin powders and polyolefin granulates are reacted at reaction temperatures of 100° to 40° C. below the melting temperature or softening temperature of the polyolefins with 5 to 30% by weight, based on the polyolefins used, of acrylic acid, acrylonitrile, $C_4$ to $C_{21}$ acrylate esters, methacrylic acid, methacrylonitrile, $C_5$ to $C_{22}$ methacrylate esters, styrene, monoalkyl ($C_1$ to $C_{12}$) styrenes, dialkyl ($C_1$ to $C_6$) styrenes, $C_1$ to $C_{12}$ alkoxy styrenes, monohalogenstyrenes, $C_1$ to $C_{11}$ alkyl esters of styrene carboxylic acid and/or unsaturated $C_4$ to $C_{21}$ dicarboxylic acid anhydrides in the presence of 0.05 to 0.85% by weight, based on the polyolefins used of acyl peroxides, alkyl peroxides, hydroperoxides, peroxycarbonates and/or peresters, b) in the second reaction step in the solid phase at reaction temperatures of 60° to 20° C. below the melting temperature or the softening temperature of the polyolefins, the polyolefins, modified in a), are reacted with 0.5 to 20% by weight, based on the polyolefins used, of acrylonitrile, methacrylonitrile, $C_5$ to $C_{22}$ methacrylate esters, styrene, monoalkyl ($C_1$ to $C_{12}$) styrenes, dialkyl ($C_1$ to $C_6$) styrenes, $C_1$ to $C_{12}$ alkoxy styrenes, monohalogenstyrenes, $C_1$ to $C_{11}$ alkyl esters of styrene carboxylic acid, $C_5$ to $C_{14}$ vinylsilanes, $C_6$ to $C_{15}$ acrylatesilanes, vinylpyridine, vinyloxazolin, isopropenyloxazolin, vinylpyrrolidone, aminoalkyl ($C_1$ to $C_8$) acrylates, aminoalkyl ($C_1$ to $C_8$) methacrylates, $C_3$ to $C_{20}$ vinyl ethers, hydroxyalkyl ($C_1$ to $C_8$) acrylates, hydroxyalkyl ($C_1$ to $C_8$) methacrylates and optionally with 0.1 to 5% by weight, based on the polyolefins used, divinylbenzene, allyl acrylate, allyl methacrylate, $C_8$ to $C_{14}$ diacrylates, $C_9$ to $C_{15}$ dimethacrylates, $C_{12}$ to $C_{17}$ acrylate esters of polyalcohols and/or $C_{15}$ to $C_{21}$ methacrylate esters of polyalcohols, c) in the third reaction step, in a solid phase/melt transition phase at a reaction temperature of 40° C. below the melting temperature or the softening temperature of the polyolefins up to 40° C. above the melting temperature or the softening temperature of the polyolefins, the polyolefins, modified in a) and subsequently in b), are reacted with 0.1 to 5% by weight, based on the polyolefins used, of multifunctional, unsaturated monomers of the divinylbenzene, butadiene, isoprene, $C_8$ to $C_{14}$ diacrylate, $C_9$ to $C_{15}$ dimethacrylate, $C_{12}$ to $C_{17}$ acrylate ester of polyalcohols, $C_{15}$ to $C_{21}$ methacrylate ester of polyalcohols and/or $C_9$ to $C_{22}$ bismaleiimide type and d) in a melt homogenization step, the polyolefins, modified in the three reaction steps a, b and c are melted and homogenized in a known manner optionally with the addition of 0.01 to 45% by weight, based on the polyolefins used, of auxiliary materials, with heating of the polyolefins to temperatures of 15° to 130° C. above the melting temperature or the softening temperature of the polyolefins, at residence times of 0.2 to 4 minutes and, optionally, with the addition of entraining agents, degassed and discharged, and wherein, during the second reaction step b) and/or during the third reaction step c) and/or during the melt homogenizing step d), 1 to 40% by weight, based on the polyolefins used, of further polymer granulates selected from polystyrenes, styrene-butadiene-styrene block copolymers, styrene-ethylene-butadiene-styrene block copolymers, styrene-isoprene-styrene block copolymers, ethylene-propylene rubbers, ethylene-propylene-diene rubbers, polyamides, polyethylene terephthalate, polybutyiene terephthalate, polycarbonates, polyphenylene oxides, liquid crystalline polymers, polyethylene glycols and/or polypropylene glycols, as well as oligoethylene glycols and/or oligopropylene glycols may optionally be added.

6. The method for the production of segmented polyolefins of claim 5, characterized in that the reaction of mixtures of polyolefin powders and polyolefin granulates with unsaturated monomers takes place in a mixer cascade of two heatable, continuous screw conveyors for powdery media and one extruder of high homogenizing action.

7. The method for the production of segmented polyolefins of claim 5, characterized in that the reaction of the mixtures of polyolefin powders and polyolefin granulates with unsaturated monomers takes place in a cascade extruder of mutually coupled mixing cells.

8. The method for the production of segmented polyolefins of claims 5, 6 or 7, characterized in that the reactor assembly, in which the reaction of the mixtures of polyolefin powders and granulates with unsaturated monomers is carried out, is equipped with propeller mixing units for effectively homogenizing the reaction mixtures before discharge of the reaction mixtures into the reactor assembly for reaction step b or c or for the melting step d.

9. The method for the production of segmented polyolefins of claim 5, 6 or 7, characterized in that the reactor assembly for reaction step b) and/or c) and/or the reactor assembly for the melting step d) are equipped with metering facilities for polymer granulates and/or highly viscous media.

10. Films, sheets, fibers, panels, coatings, pipes, hollow objects and foams comprising the segmented polyolefins of claim 1 or 2, optionally in admixture with unmodified polyolefins.

* * * * *